United States Patent [19]
DeVita

[11] 3,883,845
[45] May 13, 1975

[54] SIGNAL LIGHT ADAPTER FOR TRAILERS

[76] Inventor: Peter Michael DeVita, 1752 John St., Thornhill, Ontario, Canada

[22] Filed: Sept. 10, 1973

[21] Appl. No.: 395,932

[52] U.S. Cl. ............................................... 340/67
[51] Int. Cl. ............................................ B60q 1/00
[58] Field of Search .............. 340/67, 78; 307/10 LS

[56] References Cited
UNITED STATES PATENTS
3,601,795   8/1971   Shimizu et al. ........................ 340/67
3,656,103   4/1972   Tanaka ................................. 340/67

*Primary Examiner*—Donald J. Yusko

[57] ABSTRACT

An electrical signal system for vehicles - particularly trailers - is provided whereby separate brake and turning signals of the vehicles may be applied to a single lamp in such a manner that, when both the brake and turn signals are to be imposed on the lamp, the turn signal takes priority and is indicated by the lamp. The system is particularly adapted to trailers having a single lamp or lamp cluster at each rear corner and which can be towed by automobiles or other vehicles having separate turn signal and brake signal lamps; so that simple connections may be made to the lamps of the towing vehicle. No additional power source is needed, the power being derived from the signal lines to the lamps of the towing vehicle.

4 Claims, 6 Drawing Figures

SIGNAL LIGHT ADAPTER FOR TRAILERS

FIELD OF THE INVENTION

This invention relates to an electrical signal system for vehicles, and particularly a signal system which permits both brake and turn signals to be indicated by a single lamp on a vehicle with priority being given to the turn signal when both types of signals are activated.

BACKGROUND OF THE INVENTION

There are many vehicles which have a single lamp or lamp cluster at each rear corner of the vehicle, and which are intended to indicate both turn signals and brake signals for the vehicle. That is, the single lamp or lamp cluster may have a pulsed voltage signal applied to it to illuminate the lamp in a flashing manner to indicate a turn signal for the vehicle, or the lamp may have a steady illumination to indicate a braking signal. However, the turn signal and the brake signal are each derived from different sources or signal lines; and when both the turn signal and brake signal lines have signals on them, it is desirable to give priority to the turn signal so that a following vehicle knows that the vehicle which it is following is about to turn; and in any event, when both turn signal and brake signal are working, the brake signal on the other side of the vehicle from the turn signal will be on.

The above problem becomes acute when it is desired to attach the signal lamps of a trailer - particularly a recreation or small utility trailer - to the rear signal lamps of an automobile or other vehicle which is to tow the trailer. Normally, small utility trailers and recreation trailers are of the sort which has a single lamp or lamp cluster at each rear corner for signalling purposes, and the lamps are illuminated by being attached to the towing vehicle by wires so as to pick up a system ground and to pick up the voltage and thereby the power to illuminate the trailer lamps appropriately. This can usually be effected merely by attaching a wire to the lamp socket of the signal lamp of the automobile. Most automobiles which are designed in North America have a priority signalling system in the control circuitry of the automobile, so that a single wire leads to the signal lamp of the automobile; and the control circuitry of the automobile assures that a turn signal is given priority over a brake signal on that single line. Thus, the attachment of a trailer having a single lamp at each rear corner to an automobile having essentially the same lamp installation may be easily effected.

However, there are many automobiles - particularly those from Europe or Japan - which have separate lamps or lamp clusters for indicating turn signals and brake signals. Attachment of a trailer signal lamp to such an automobile is then difficult, because a short-circuit might develop in the automobile if a person unwittingly attached separate wires from the trailer lamp to the turn signal and brake signal lines of the automobile rather than to ground and a signal line; or, in any event, parallel connections of the trailer signal lamp to the automobile signal lamps would result in the turn signal to the trailer lamp being overridden in the event that both the turn signal and brake signal lines of the automobile have signals on them.

It has been the practice of dealers who sell or rent trailers to the public - or trailer owners - when the towing vehicle has separate brake and turn signal lamps, to either provide a separate pair of lamps on the trailer so that the trailer would have two signal lamps or lamp clusters at each corner for connection to the turn signal and brake signal lamps on each side of the automobile; or to provide a single brake signal lamp at the centre of the rear of the trailer with the corner lamps or the trailer connected to the turn signal lamps of the automobile; or to ignore the turn signal lamps and attach the signal lamps of the trailer only to the brake lamps of the automobile. The above approaches to the solution of the problem may, of course, be expensive, or they may cause unsightly damage or alteration to a trailer, or be unsafe.

The present invention, on the other hand, provides a signal system for a vehicle - particularly a trailer - where a single lamp on each corner of the vehicle can be attached to a brake signal line and a turn signal line with the assurance that the brake signal will be inhibited from causing a steady illumination of the lamp when a turn signal is present. Thus, a trailer having a single signal lamp at each rear corner may be attached to an automobile having separate turn signal and brake signal lines at its rear signal lamps, by inserting a small circuit as provided by this invention between the turn signal and brake signal lines of the automobile and the single signal lamp of the trailer, for each side thereof. This is accomplished by providing sensing means to sense the presence or absence of a turn signal on the turn signal line of the automobile where the sensing means is connected to means for inhibiting a brake signal to the trailer lamp when a turn signal is sensed. The means for inhibiting a brake signal to the trailer lamp when a turn signal is sensed is an exclusive OR gate, which permits the lamp to indicate a brake signal only when no turn signal is sensed on the automobile turn signal line. The present invention also provides alternative circuits whereby the flashing turn signal of the trailer can be out of phase with the flashing turn signal of the automobile when both brake and turn signals of the automobile are on; or with the provision of another circuit having a storage or memory element, the flashing turn signal of the trailer can be in synchronism with the flashing turn signal of the automobile.

BRIEF SUMMARY OF THE INVENTION

This invention provides a signal system which is particularly adapted for installation with a trailer having a single signal lamp which is intended to indicate and be powered by signals on separate turn signal and brake signal lines of the towing vehicle, where priority is given to indication of the turn signal if both turn signal and brake signal lines of the towing vehicle have signals on them.

A further object of this invention is to provide alternative embodiments of a signal system for trailers intended to be connected to towing vehicles, where the trailer has a single signal lamp at each rear corner and the towing vehicle has separate turn and brake signal lines, where the signal system can be easily and inexpensively manufactured and easily and quickly connected to the towing vehicle and to the trailer.

A feature of this invention is that alternative embodiments of the signal system referred to above are provided whereby the flashing turn signal of the trailer may be in phase or out of phase with the respective flashing turn signal of the towing vehicle.

DESCRIPTION OF THE DRAWINGS

These and other objects, features and advantages of the present invention are discussed in greater detail hereafter, in association with the accompanying drawings, in which.

DESCRIPTION OF THE PREFERRED EMBODIMENTS

Figure 1:
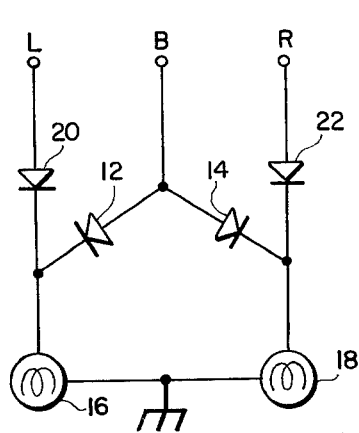
FIG. 1 is a basic circuit showing a general arrangement for connecting signal lamps of a trailer to separate brake and turn signal lines of a towing vehicle.

FIG. 1 shows a cross-over network of diodes, and provides a means whereby left and right turn signal lines and a brake signal line can be combined to power individual signal lamps. A number of shortcomings are found in FIG. 1 as discussed hereafter, but nonetheless the circuit shows the manner by which separate brake signal and turn signals lamps on each side of a towing vehicle can be connected to a single lamp on a trailer. Thus, if there is a signal on the brake signal line B of the towing vehicle, which would illuminate a brake signal lamp of the towing vehicle (not shown), the line B is connected through diodes 12 and 14 to trailer lamps 16 and 18 on the left and right sides of the trailer, respectively. Diodes 20 and 22 prevent feedback of the brake signal to the left and right turn signal lines of the towing vehicle, L and R, respectively. Thus, the presence of a signal on the brake signal line B would illuminate both lamps 16 and 18 with a steady illumination. If a turn signal appears on either of turn signals L or R, and no signal is on the brake signal line B, the respective one of lamp 16 or 18 will turn on and off by the series of voltage pulses which comprises the turn signal, so as to provide a flashing illumination of the respective one of lamps 16 or 18. Thus, if a turn signal is on turn signal line L of the towing vehicle, which turn signal comprises a series of voltage pulses, the voltage pulses are passed by diode 20 to lamp 16 and are blocked by diode 12 from being fed to the other side of the trailer.

However, if there is a signal on the brake signal line B, and either of the turn signal lines L or R also carries a signal, the additional turn signal would not be distinguished at either of lamps 16 or 18 because they would have a steady illumination in any event from the brake signal. Thus, if the brakes of the towing vehicle are applied at the same time that a turn signal is being indicated, the trailer having lamps 16 and 18 is incapable of indicating the turn signal.

Figure 2:
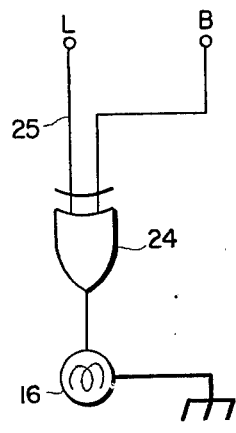
FIG. 2 is a basic logic circuit showing the manner in which a turn signal may be given priority over a brake signal.
Figure 3:
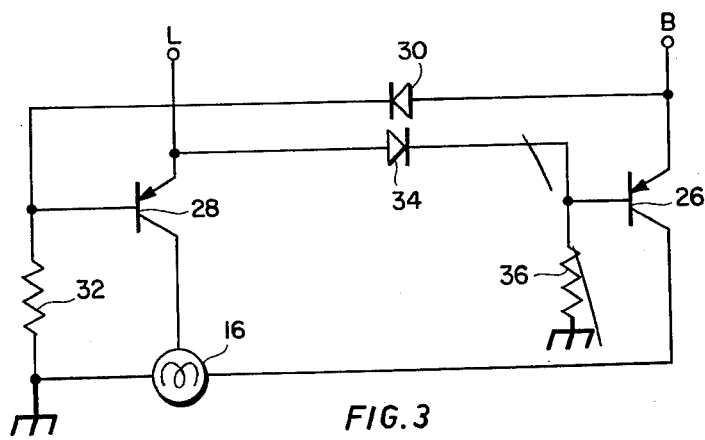
FIG. 3 is a basic embodiment of a circuit which provides one means of inhibiting a brake signal in the presence of a turn signal.
Figure 4:
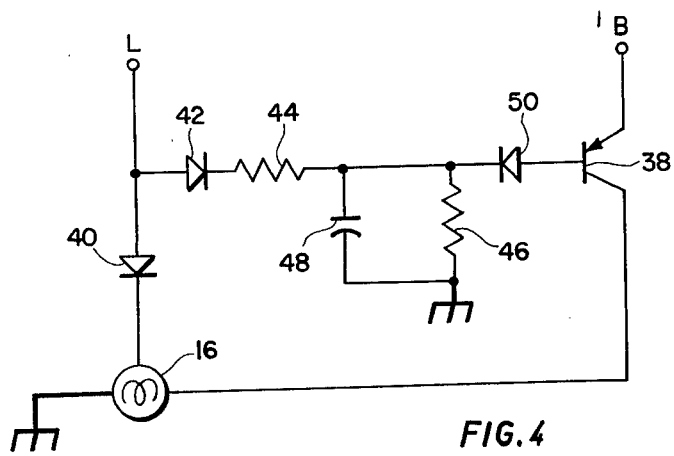
FIG. 4 is a basic embodiment of an alternative circuit arrangement for inhibiting a brake signal in the presence of a turn signal, and including a memory element.

The circuit of FIG. 2 therefore provides a basic circuit using exclusive-OR logic and having an exclusive-OR gate 24, whereby the lamp 16 will indicate a turn signal by providing a flashing illumination during a time interval when both the turn signal line L and the brake signal line B of the towing vehicle have signals on them, the turn signal being, as noted above, a series of voltage pulses and the flashing illumination being, as noted hereafter, "out of phase" with the illumination of a similar lamp on the towing vehicle. [It will be understood, of course, that FIG. 2 - as well as FIGS. 3 and 4 - show a circuit having relevance only to the left side of the trailer and towing vehicle, and that in actual fact the circuit would be entirely symmetrical with respect to the right side of the trailer and the towing vehicle.] Thus, FIG. 2 shows an electrical signal system for a trailer with at least one lamp at its rear left corner - as well as least one lamp at its rear right corner, not shown - each of which lamps is intended to indicate both a brake signal and a respective left or right turn signal. The brake signal line B and the turn signal line L (or R) are in the towing vehicle and are connected to means for generating a brake signal or a turn signal on the brake signal line or turn signal lines, respectively; and as noted, the turn signal comprises a series of voltage pulses which are at a different level than a system reference voltage so that the visible turn signal indicated by a lamp which is connected to the turn signal line is a flashing illumination, whereas the brake signal line is a steady voltage at a different level than the system reference voltage so that the visible brake signal indicated by a lamp connected to the brake signal line is a steady illumination. The lamp 16 is connected to the brake line B and the left turn signal line L of the towing vehicle through a priority signal circuit which is interposed between the lamp 16 and the signal lines of the towing vehicle to inhibit a brake signal passing to the lamp 16 from brake signal line B when there is a turn signal on the turn signal line L. In general terms, sensing means are provided to sense the presence or absence of the turn signal on turn signal line L, said sensing means in FIG. 2 being line 25, and line 25 is connected to gate 24 which is an exclusive-OR gate.

With respect to the signal lines B and L of the towing vehicle, and lamp 16 of the trailer, four conditions exist where the condition or status of the lamp 16 is determined by the status of each of lines B and L which are inputs to the exclusive-OR gate 24, where the lamp 16 is connected to the output of the exclusive-OR gate 24. Those conditions are set out in the following table.

TABLE I

| Condition | Signal Lines | | Trailer Lamp |
|---|---|---|---|
| | Brake | Turn | |
| I | OFF | OFF | OFF |
| II | OFF | ON | ON |
| III | ON | OFF | ON |
| IV | ON | ON | OFF |

Having regard to FIG. 2, when Condition I exists, it is obvious that lamp 16 is not illuminated. Also, when Condition II exists, the lamp 16 is illuminated; and thus, when no brake signal is on the brake signal line B of the towing vehicle, the lamp 16 flashes at the same time as a voltage pulse appears on the turn signal line L.

However, when the brake signal line R has a signal on it, as in Conditions III and IV above, the status of the illumination of lamp 16 is dependent upon the instantaneous voltage status of the towing vehicle turn signal line L as sensed by line 25 connected to one of the inputs of the exclusive-OR gate 24. Thus, if there is no voltage on turn signal line L of the towing vehicle, lamp 16 is illuminated as indicated in the table as Condition III. If, however, a voltage pulse appears on the turn signal line L, the exclusive-OR gate 24 is turned off and lamp 16 is not illuminated, as indicated at Condition IV in the Table. If a turn signal is on the turn signal line L, and as noted above the turn signal comprises a series of voltage pulses, it becomes readily apparent that the illumination of lamp 16 is out of phase with the illumination of a turn signal indicating lamp on the towing vehicle which would be connected to the turn signal line, and lamp 16 is illuminated only between the voltage pulses which would be sensed on the turn indicator line L. The brake signal voltage would be passed by the gate 24 to lamp 16 when there is no voltage pulse sensed on turn signal line L; but the brake signal per se - which is visibly indicated by a steady illumination of the lamp - is inhibited by the next pulse which appears at the exclusive-OR gate 24 from the turn signal line L.

FIG. 3 shows a basic but practical embodiment of a logic circuit which operates in accordance with Table I above, and which, in accordance with this invention, provides an electrical signal system for a trailer whereby a priority circuit is established so that a turn signal is given priority over a brake signal when both occur on separate signal lines of the towing vehicle. In the circuit of FIG. 3, lamp 16 is connected to the collectors of transistors 26 and 28. The brake signal line B is connected to the emitter of transistor 26, and through diode 30 to the base of transistor 28, and thence resistor 32 to ground. Likewise, the turn signal line L is connected to the emitter of transistor 28, and through diode 34 to the base of transistor 26 and thence through resistor 36 to ground. Each of the brake and signal lines of the towing vehicle are therefore each connected to the emitter of one transistor and through a diode to the base of the other transistor; and each of transistors 26 and 28 acts as a switch having an exclusive-OR function, as described below.

If a signal voltage appears on either of the signal lines L or B, and not on the other, the instantaneous operation of the circuit of FIG. 3 is as follows. The transistor whose emitter is attached to the signal line having the voltage saturates, and the signal is passed to the lamp 16. Thus, if a voltage pulse appears at turn signal line L and there is no signal at B, the voltage pulse turns transistor 28 on and passes to lamp 16 to illuminate it. At the same time, the voltage pulse at L is passed by diode 34 to the base of transistor 26. Similarly, when there is no voltage on turn signal line L but there is on brake signal line B, the voltage turns transistor 26 on and passes to lamp 16 to illuminate it; and at the same time is passed by diode 30 to the base of transistor 28. However, when both the signal lines B and L have a voltage upon them - brake signal line B having a steady voltage and turn signal line L having a series of voltage pulses - both transistors 26 and 28 are turned off during the period of a voltage pulse on signal line L because of their base voltage, and lamp 16 is not illuminated. When, during a turn signal, the voltage on the turn signal line L reduces to the system reference potential, the voltage at the base of transistor 26 collapses and transistor 26 turns on so that lamp 16 is illuminated. As soon as the next voltage pulse appears at line L, however, transistor 26 is turned off and the illumination of lamp 16 ceases. Thus, it will be noted that lamp 16 is illuminated for the time interval between voltage pulses of the turn signal on turn signal line L; and while, in fact, the power to illuminate the lamp 16 is derived from the brake signal line B, the brake signal per se is not passed to the lamp 16 because the lamp is not continuously illuminated but has a flashing illumination which is out of phase with the illumination of the turn indicator lamp or lamp cluster on the towing vehicle. Thus, the sensing means in FIG. 3 for sensing the presence or absence of a turn signal on the turn signal line L is the transistor 28 which is turned on when there is no signal on brake signal line B and which is turned off when there is a signal on brake signal line B of the towing vehicle; and the brake signal inhibiting means is transistor 26 which is turned off when there is a brake signal on brake signal line B and also a voltage pulse on the turn signal line L of the towing vehicle. As noted, transistor 26 conducts between pulses on the turn signal line L, but the effect on lamp 16 is a flashing illumination which is out of phase with the voltage pulses on turn signal line L, so that to the viewer a turn signal is being indicated by lamp 16 in FIG. 3.

Turning now to FIG. 4, there is shown an alternative electrical signal system for a trailer, as noted above, but where the lamp 16 is made to be illuminated or to flash in synchronism with the voltage pulses on the turn signal line L, rather than out of phase therewith as happens with the circuit of FIG. 3. In FIG. 4, a memory or storage element is introduced so as to "remember" the prior status of the turn signal line of the towing vehicle for a period of time as is determined by a discharge characteristic of a parallel RC circuit. Thus, the turn signal line L is connected through diode 40 to the lamp 16; and through diode 42 and resistor 40 to a parallel RC circuit having resistor 46 and capacitor 48. Each of the resistor 46 and the capacitor 48 is connected to ground, and the other end of the resistor and capacitor is connected to resistor 44 and through outward facing diode 50 (whose purpose is discussed hereafter) to the base of transistor 38. When a signal appears at brake signal line B, and there is no signal on turn signal line L, lamp 16 is illuminated because transistor 38 is turned on. When a voltage pulse appears on the turn signal line L and there is no signal on brake signal line B, the voltage pulse passes directly through diode 40 to lamp 16, and the lamp is illuminated in synchronism with the turn signal lamp or lamps of the towing vehicle. However, when there is a signal on brake signal line B and a signal on the turn signal line L, the operation of the circuit of FIG. 4 is as follows.

When a voltage pulse first appears on turn signal line L, it immediately passes to lamp 16 through diode 40. At the same time, diode 42 conducts current from the turn signal line L through resistor 44 to the RC circuit 46, 48 so that capacitor 48 begins to charge and the voltage across it rises. The values of resistors 44 and 48 and capacitor 48 are chosen that the charging time of the RC circuit 44, 48 is very fast; and because diode 42 precludes discharge of the capacitor 48 back through resistor 44, its discharge is forced through resistor 46 to ground over a much longer period. The discharge time constant of the RC circuit 46, 48 is chosen so as to be of the same order of, or greater than, the period between voltage pulses of a turn signal on the turn signal line of the towing vehicle; and the time constant of the RC circuit 44, 48 is chosen to be much shorter than the time period of a voltage pulse of a turn signal on the turn signal line of the towing vehicle. Thus, during the first voltage pulse that occurs on the turn signal line L when there is already a voltage on the brake signal line B, the capacitor 48 is sufficiently charged to turn transistor 38 off. At the end of the voltage pulse on turn signal line L, capacitor 48 begins to discharge through resistor 46, but if the circuit components have been chosen correctly, the voltage on the capacitor 48 remains sufficiently high throughout the period between voltage pulses on turn signal line L to keep the transistor 38 off. A diode 50 may be inserted as shown in FIG. 4 to effectively increase the time constant of the RC circuit 46, 48 by reducing the cut-in voltage of the transistor 38. The time constant of the RC circuit 46, 48 is, in any event, such that, illumination of lamp 16 is for a sufficient period of time as to assume a discernible turn signal.

Assuming that the transistor 38 has remained off, when the next voltage appears at the turn signal line L, capacitor 48 begins to charge once again through resistor 44; and at the same time, lamp 16 is illuminated. Thus, the lamp 16 is illuminated and flashes in synchronism with the turn signal lamp of the towing vehicle.

FIG. 4 therefore provides a basic, practical embodiment of a circuit where the transistor 38 has an exclusive-OR function with the delayed turn signal, and is connected to means to sense the presence or absence of a signal on the turn signal line L in such a way that is turned off in the presence of a voltage output from the sensing means which is indicative of the presence of a turn signal on the turn signal line. The sensing means may, of course, simply comprise diode 42 which would function to keep transistor 38 turned off when a voltage pulse appears on the turn signal line L. However, FIG. 4 provides a memory or storage element including a parallel RC storage circuit whose discharge time constant is greater than the length of time between voltage pulses on the turn signal line; and the RC storage circuit 46, 48 is connected to the base of transistor 38 so as to hold the transistor off, even in the presence of a voltage on the brake signal line B, for as long as there is sufficient voltage across capacitor 48. In general, and as noted above, the charging time constant of the series RC circuit 44, 48 is less than the period of any one voltage pulse on the turn signal line L.

It should also be noted, with respect to FIG. 4, that the brake signal is inhibited with respect to lamp 16 for as long as sufficient voltage remains on capacitor 48 to keep transistor 38 in a non-conductive condition. Thus, there is a certain time delay before the brake signal is re-enabled, so that the flashing rate of the trailer signal lamp remains substantially constant, even if the brakes of the towing vehicle are being "pumped" at a rate which may be nearly identical to the pulse rate of the turn signal.

The circuits which are shown in FIGS. 3 and 4 are practical but basic circuits. In general, certain amendments to the circuits would be made, such as the insertion of outward facing diodes in the bases of the transistors 26 and 28 of FIG. 3 to enhance the switching effect of those transistors; or the insertion of diode springs in the place of diode 50 of FIG. 4 or Darlington pairs or triples in the place of transistor 38. Transistors might also be field effect transistors, and could be NPN as well as PNP. In addition, certain other amendments to the circuits may be made, such as hybridization, where discrete circuit components can be replaced by integrated circuits which might then drive a power resistor, and so on. Obviously such circuits can be miniaturized to quite an extent, and provided on printed circuit boards, and encapsulated, or set up for automatic production.

Figure 5:
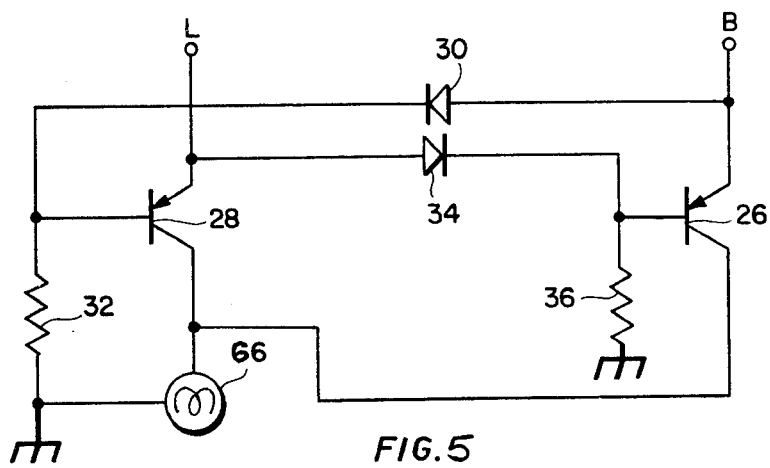
FIGS. 5 and 6 are circuits corresponding to FIGS. 3 and 4 respectively, but confined to single filament lamps.
Figure 6:
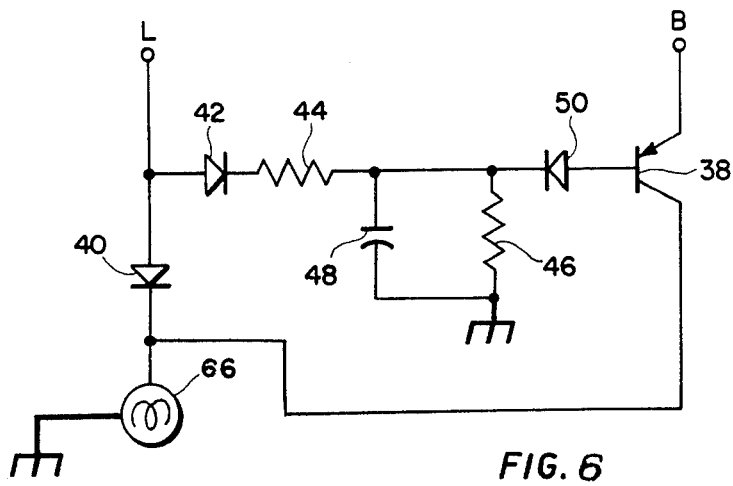

FIGS. 5 and 6 are similar in all respects to FIGS. 3 and 4 discussed above, except that lamp 66 in each circuit is a single filament lamp which is connected, at one end, to each of transistors 28 and 26 in FIG. 5 and diode 40 and transistor 38 in FIG. 6, respectively. It will be understood that dual filament lamps may be used for lamps 16 in the circuits of FIGS. 3 and 4, having a common connection to ground.

Other alternative embodiments and circuit arrangements may be provided, apart from the circuits which have been shown and described and which are intended to be exemplary and not inclusive; and all such embodiments and circuit arrangments are to be considered in the light of the accompanying claims.

What I claim is:

1. An electrical signal processing system for a trailer having at least one lamp at its rear left corner and at least one lamp at its rear right corner, each intended to indicate both a brake signal and a respective left or right turn signal; where means is provided in a vehicle intended for towing said trailer, for generating a brake signal on a brake signal line and a turn signal on a turn signal line, where said turn signal comprises a series of voltage pulses at a different level than a system reference voltage so that the visible turn signal indicated by a lamp connected to said turn signal line is a flashing illumination, and said brake signal is a steady voltage at a different level than said system reference voltage so that the visible brake signal indicated by a lamp connected to said brake signal line is a steady illumination; comprising:

means for connecting said at least one lamp at each corner of said trailer to said brake signal line and the respective turn signal line of said towing vehicle;

and a priority signal circuit interposed between each said at least one lamp and said brake line and respective turn signal line for inhibiting a brake signal to said lamp when a turn signal is on said respective turn signal line, including sensing means to sense the presence or absence of a turn signal on said respective turn signal line, said sensing means being operable from the voltage of the signal being senses, and being connected to gate means for inhibiting a brake signal to said lamp so as to impress a voltage derived from said signal being sensed onto said gate means;

said gate means for inhibiting a brake signal to said lamp being such that when a turn signal is sensed by said sensing means, said gate means inhibits said brake signal voltage from being impressed on said lamps;

said priority signal circuit being comprised of elements which become operative and derive their operating power from said brake and signal lines only when signals are generated on said lines from said towing vehicle, said electrical signal processing system remaining otherwise inactive;

said brake signal line and a turn signal line of said towing vehicle being each respectively connected to a first terminal of a respective first and second switching means, and also to a second terminal on the other of said first and second switching means, the outputs of each of said first and second switching means being connected together to said lamp; each of said first and second switching means being a transistor whose base is said second terminal; where each said base is connected through a diode to the respective one of said turn signal line or said brake signal line of said towing vehicle, so that each transistor is turned off in the presence of a voltage pulse on said turn signal line and a voltage on said brake signal line.

2. An electrical signal processing system for a trailer having at least one lamp at its rear left corner and at least one lamp at its rear right corner, each intended to indicate both a brake signal and a respective left or right turn signal; where means is provided in a vehicle intended for towing said trailer, for generating a brake signal on a brake signal line and a turn signal on a turn signal line, where said turn signal comprises a series of voltage pulses at a different level than a system reference voltage so that the visible turn signal indicated by a lamp connected to said turn signal line is a flashing illumination, and said brake signal is a steady voltage at a different level than said system reference voltage so that the visible brake signal indicated by a lamp connected to said brake signal line is a steady illumination; comprising:

means for connecting said at least one lamp at each corner of said trailer to said brake signal line and the respective turn signal line of said towing vehicle;

and a priority signal circuit interposed between each said at least one lamp and said brake line and respective turn signal line for inhibiting a brake signal to said lamp when a turn signal is on said respective turn signal line, including sensing means to sense the presence or absence of a turn signal on said respective turn signal line, said sensing means being operable from the voltage of the signal being sensed, and being connected to gate means for inhibiting a brake signal to said lamp so as to impress a voltage derived from said signal being sensed onto said gate means;

said gate means for inhibiting a brake signal to said lamp being such that when a turn signal is sensed by said sensing means, said gate means inhibits said brake signal voltage from being impressed on said lamp;

said priority signal circuit being comprised of elements which become operative and derive their operating power from said brake and signal lines only when signals are generated on said lines from said towing vehicle, said electrical signal processing system remaining otherwise inactive;

where a turn signal line of said towing vehicle is connected through a diode to the respective one of said trailer lamps and to the output of switching means connected to said brake signal line of said towing vehicle, and said turn signal line is also connected to said sensing means; and where said switching means is connected to said sensing means and to said brake signal line so as to be turned off in the presence of a voltage output from said sensing means indicative of the presence of a turn signal on said turn signal line.

3. The system of claim 2 where said switching means comprises at least one transistor whose base is connected to said sensing means; and said sensing means comprises at least a diode connected so as to inhibit the operation of said transistor when a voltage pulse on said turn signal line is sensed.

4. The system of claim 3 where said sensing means further comprises a parallel RC storage circuit whose discharge time constant is at least of the order of the length of time between voltage pulses on said turn signal line when said means for generating a turn signal is operating, said RC storage circuit being connected to said switching means so as to hold said switching means off in the presence of a voltage on said brake signal line so long as sufficient voltage remains across the capacitor of said RC circuit.

* * * * *